US012209804B2

(12) United States Patent
Alsubaie et al.

(10) Patent No.: US 12,209,804 B2
(45) Date of Patent: Jan. 28, 2025

(54) ROTARY DRYER AND METHOD OF USING THE SAME

(71) Applicant: SABIC GLOBAL TECHNOLOGIES B.V., Bergen op Zoom (NL)

(72) Inventors: Nasser Mansour Alsubaie, Riyadh (SA); Ahmed Abouelfetouh Youssef, Houston, TX (US); Allen Lee White, Mount Vernon, MI (US); Vern Lowry, Ottawa, IL (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 557 days.

(21) Appl. No.: 17/631,531

(22) PCT Filed: Aug. 24, 2020

(86) PCT No.: PCT/EP2020/073629
§ 371 (c)(1),
(2) Date: Jan. 31, 2022

(87) PCT Pub. No.: WO2021/037796
PCT Pub. Date: Mar. 4, 2021

(65) Prior Publication Data
US 2022/0268519 A1 Aug. 25, 2022

(30) Foreign Application Priority Data
Aug. 23, 2019 (EP) .................................... 19193296

(51) Int. Cl.
*F26B 11/04* (2006.01)
*F26B 21/00* (2006.01)

(52) U.S. Cl.
CPC ............ *F26B 11/04* (2013.01); *F26B 21/001* (2013.01)

(58) Field of Classification Search
CPC ........................................................ F26B 11/04
See application file for complete search history.

(56) References Cited

U.S. PATENT DOCUMENTS 896,025 A * 8/1908 Koneman ............. F26B 11/028 165/90
937,172 A * 10/1909 Pearson ............... G03D 15/027 99/324
(Continued)

FOREIGN PATENT DOCUMENTS

CN 203724844 U 7/2014
GB 799847 A 8/1958
(Continued)

OTHER PUBLICATIONS

European Search Report for the corresponding European Application No. 19193296.1; 6 pages.
(Continued)

*Primary Examiner* — David J Laux
(74) *Attorney, Agent, or Firm* — CANTOR COLBURN LLP

(57) ABSTRACT

A rotary dryer for resin dehydration, comprising: a cylindrical body which rotates about an axis perpendicular to a diameter of the cylindrical body; an air filter located outside the cylindrical body; coils located outside the cylindrical body, wherein the coils are oriented vertically and oriented parallel to the diameter of the cylindrical body, wherein the coils do not comprise horizontal surfaces; and lifters located within the cylindrical body.

20 Claims, 5 Drawing Sheets

(56) References Cited

U.S. PATENT DOCUMENTS

| | | | | | |
|---|---|---|---|---|---|
| 1,557,880 | A * | 10/1925 | Richter | F26B 11/028 | 34/131 |
| 2,880,524 | A * | 4/1959 | Hiller | F26B 11/187 | 34/128 |
| 2,904,896 | A * | 9/1959 | Forrest | B29B 13/065 | 34/591 |
| 3,395,905 | A * | 8/1968 | Isheim | F26B 11/028 | 34/137 |
| 3,597,850 | A * | 8/1971 | Jenkins | F26B 17/128 | 34/361 |
| 4,029,572 | A * | 6/1977 | Theodore | B07B 4/06 | 432/112 |
| 4,683,664 | A * | 8/1987 | Codenotti | F26B 3/22 | 432/198 |
| 5,670,024 | A * | 9/1997 | Baltzer | C03B 37/10 | 202/136 |
| 2018/0073734 | A1* | 3/2018 | Savage | F23G 7/068 | |
| 2019/0072328 | A1* | 3/2019 | Aaron | F26B 17/24 | |

FOREIGN PATENT DOCUMENTS

| | | |
|---|---|---|
| JP | 2003050087 A | 2/2003 |
| WO | 2017019449 A1 | 2/2017 |

OTHER PUBLICATIONS

International Search Report for the corresponding International Application No. PCT/EP2020/073629; Internatonal Filing Date: Aug. 24, 2020; Date of Mailing: Nov. 4, 2020; 37 pages.

Mujumdar, A. S., "Dryers for Particulate Solids, Slurries and Sheet-Form Materials," Innovation In Drying Techniques, Chapter Three; 41 pages.

* cited by examiner

ROTARY DRYER AND METHOD OF USING THE SAME

CROSS-REFERENCE TO RELATED APPLICATIONS

This application is a National Stage application of PCT/EP2020/073629, filed Aug. 24, 2020, which claims benefit of European Application No. 19193296.1 filed on Aug. 23, 2019, both of which are incorporated by reference herein in their entirety.

BACKGROUND

Rubber and latex are produced via the polymerization of petrochemical monomers. For example, polybutadiene is a synthetic rubber polymer formed from the polymerization of butadiene monomer. Polybutadiene has a high resistance to wear and a high electrical resistivity. Polybutadiene can be used in the manufacture of tires and can also be used as an additive to improve the impact resistance of plastics, for example, polystyrene and acrylonitrile butadiene styrene (ABS). Polybutadiene rubber accounted for approximately 25% of total global consumption of synthetic rubbers in 2012. Polybutadiene can also be used to manufacture golf balls, elastic objects, and electronic assembly coatings. ABS copolymer resins in particular are engineering thermoplastics used in electronics, appliances, business equipment, and automobile parts.

In oxygen, ABS powder can ignite and lead to a catastrophic explosion in a contained system. Two factors that can cause ABS to ignite are 1) thermal oxidation of the base polymer; and 2) initiation of a dust explosion via a static discharge. ABS and other similar polymers have limited thermal oxidative stability and readily undergo violent oxidation with prolonged exposure to elevated temperature and oxygen. The thermal oxidation is extremely exothermic reaction and can lead to fire and or explosion. ABS resin also has a tendency to explode due to energy from static charges. Many resin production processes use a rotary air dryer to dehydrate a wet form of the resin. During the dehydration process, resin particles and/or dust particles can accumulate on components and/or within areas of the rotary dryer. As a result, these particle accumulations can overheat and/or ignite via static discharge causing fires, explosions, and other heat related hazards.

The rotary dryer must be shut down for removal of accumulated particles. One solution is to limit oxygen drying gas by adding nitrogen. This minimizes the potential for fire and explosion but leads to other issues. For example, nitrogen increases the overall cost of the process and adds addition safety risks (e.g., exposure and asphyxiation).

Accordingly, it would be desirable to design a rotary air dryer, and method of using the same, which significantly reduces the accumulation of resin particles within the rotary dryer system, reduces the size of accumulated particles, and significantly reduces the risk of overheating, fires, explosions, and other heat related hazards.

SUMMARY

Disclosed, in various embodiments, are a rotary dryer and methods of using the same.

In one embodiment, a rotary dryer for resin dehydration, comprises: a cylindrical body which rotates about an axis perpendicular to a diameter of the cylindrical body; an air filter located outside the cylindrical body; coils located outside the cylindrical body, wherein the coils are oriented vertically and oriented parallel to the diameter of the cylindrical body, wherein the coils do not comprise horizontal surfaces; and lifters located within the cylindrical body.

In another embodiment, a method of resin dehydration using the rotary dryer comprises: feeding a feed stream comprising a wet resin into the rotary dryer; heating the coils; rotating the cylindrical body; contacting the wet resin with the lifters; and withdrawing a product stream comprising a dehydrated resin from the rotary drier.

These and other features and characteristics are more particularly described below.

BRIEF DESCRIPTION OF THE DRAWING

The following is a brief description of the drawing wherein like elements are numbered alike and which is presented for the purposes of illustrating the exemplary embodiments disclosed herein and not for the purposes of limiting the same.

DETAILED DESCRIPTION

Figure 1:
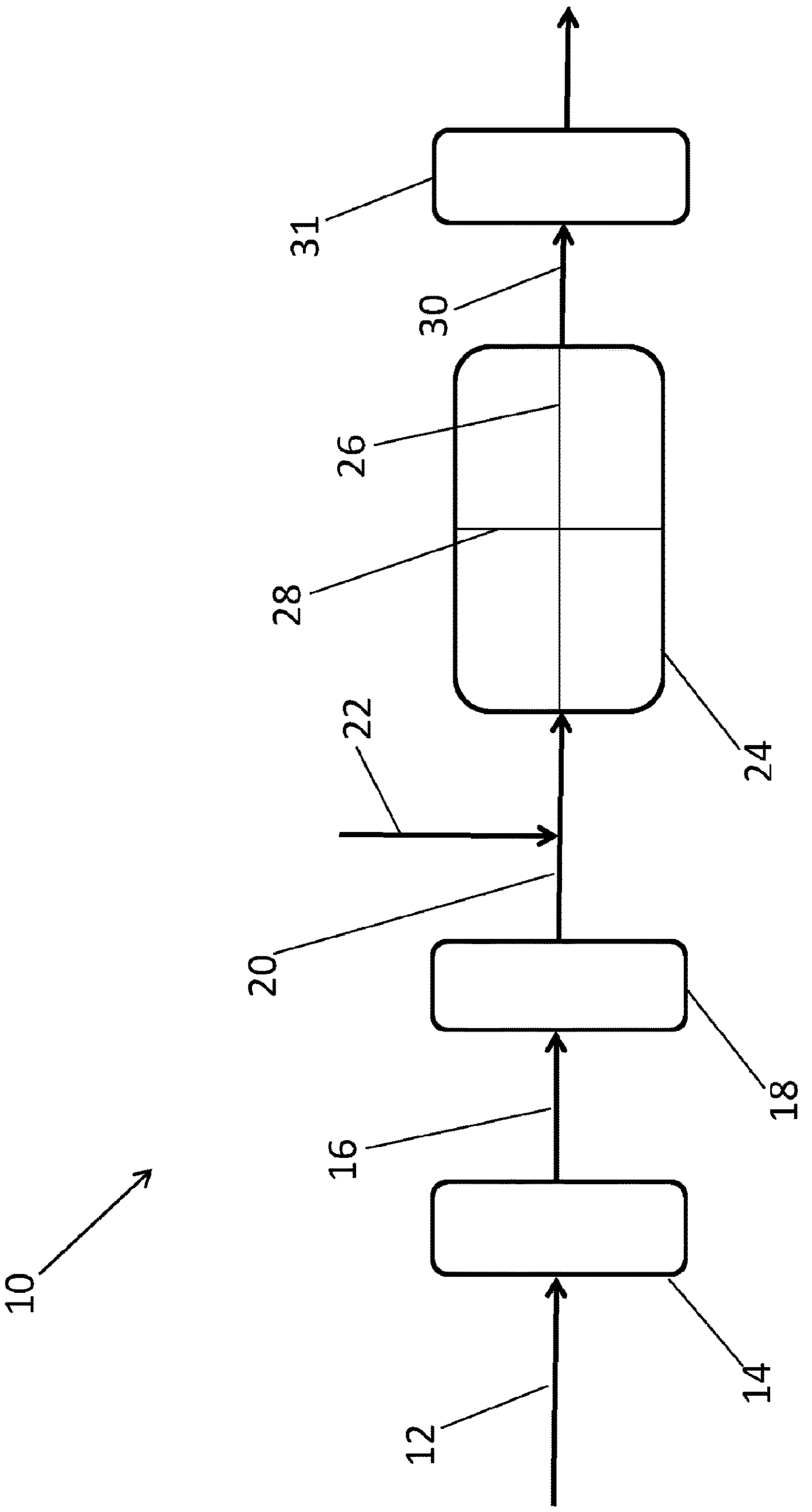
FIG. 1 is a simplified schematic diagram representing a unit configuration for a rotary dryer used in a method of resin dehydration.

The rotary dryer and method of using the same disclosed herein can significantly reduce the accumulation of resin particles on components of the rotary dryer, reduce the size of accumulated particles, and significantly reduce the risk of overheating, fires, explosions, and other heat related hazards.

The method disclosed herein can comprise feeding a feed stream comprising a wet resin into a rotary dryer. For example, a wet resin can be a resin that comprises greater than or equal to 50% resin, for example, 95% resin and 5% water. The rotary dryer can accommodate large flow rates. For example, a volumetric flow rate of the wet resin feed stream through the rotary dryer can be greater than or equal to 0.5 cubic meters per second, for example, from 0.5 cubic meters per second to 1.5 cubic meters per second.

A source of the wet resin can be an emulsion polymerization process, for example, the emulsion polymerization of styrene, acrylonitrile, polybutadiene latex, or a combination thereof. The wet resin can comprise acrylonitrile-butadiene styrene, styrene-butadiene styrene, acrylonitrile-ethylene-butadiene-styrene, methyl methacrylate-butadiene styrene, styrene acrylonitrile, styrene butadiene rubber, acrylonitrile butadiene rubber, methyl methacrylate-acrylonitrile-butadiene-styrene, or a combination thereof.

The wet resin can further comprise an antioxidant, for example, a hindered phenol, a phosphite compound, a thioester compound, or a combination thereof. For example, the wet resin can comprise a primary antioxidant and a secondary antioxidant. For example, a hindered phenol can be used as a primary antioxidant and a phosphite compound and/or a thioester compound can be used as a secondary antioxidant. A flame suppressant powder can also be passed through the rotary dryer, for example, a sodium carbonate powder can be passed through the rotary dryer.

The rotary dryer can comprise a cylindrical body. For example, a diameter of the cylindrical body can be 1.2 meters to 5.2 meters, for example, 2.2 meters to 4.2 meters, for example, about 4 meters. A length of the cylindrical body can be 9 meters to 30 meters, for example, 20 meters to 30 meters, for example, about 25 meters. The cylindrical body can rotate about an axis perpendicular to a diameter of the cylindrical body. The rotary dryer can further comprise lifters located within the cylindrical body. As the cylindrical body rotates, the wet resin will contact the lifters and be carried by the lifters around the cylindrical body. This allows the wet resin to then fall through the air from different points within the cylindrical body. Accordingly, an enhanced mixing and drying effect is achieved.

The lifters can be connected to the inside of the cylindrical body via connection mechanisms. For example, the connection mechanisms can be anything suitable for attachment of lifters to a surface, for example, mechanical brackets. The lifters can be arranged in any configuration within the cylindrical body suitable for carrying and mixing wet resin. For example, the lifters can be arranged continuously or intermittently, densely or sparsely, uniformly or variedly, and can comprise different shapes and orientations. The lifters can be tilted at an angle of 0 degrees to 90 degrees relative to an interior surface of the cylindrical body, for example 45 degrees.

The lifters can be spaced apart from the cylindrical body by 0.1 millimeters to 10 millimeters, for example, the lifters can be spaced apart from the cylindrical body by 0.5 millimeters to 5 millimeters, for example, 1 millimeters to 3.5 millimeters, for example, 2.75 millimeters to 3.1 millimeters. Spacing can be achieved, for example, via adjustment of the size of the connection mechanisms. This unique spacing arrangement can prevent lodging of resin particles in the space between the lifters and the cylindrical body, reduce the size of accumulated particles, and thus reduce risk of overheating.

The rotary dryer can further comprise heated coils located outside the cylindrical body. In other words, the coils can be stationary and do not rotate with the cylindrical body. The coils can be cylindrical and/or tubular in shape. For example, a diameter of a coil can be 5 millimeters to 50 millimeters, for example, 20 millimeters to 30 millimeters, for example, about 25 millimeters. A length of a coil can be 0.5 meters to 5 meters, for example, 2 meters to 4 meters, for example, about 3 meters. A thickness of a coil can be 0.5 millimeters to 5 millimeters, for example, 1 millimeter to 3 millimeters, for example, about 2 millimeters. Any suitable number of coils can be used, for example, 100 to 600 coils, for example, 200 to 400 coils, for example, about 300 coils. The coils can be heated in any suitable manner. For example, the coils can be heated by the passage of heated air and/or steam within the coils, or by an external heat exchanger, gas heater, electrical heater, or a combination thereof in thermal communication with the coils.

Figure 4:
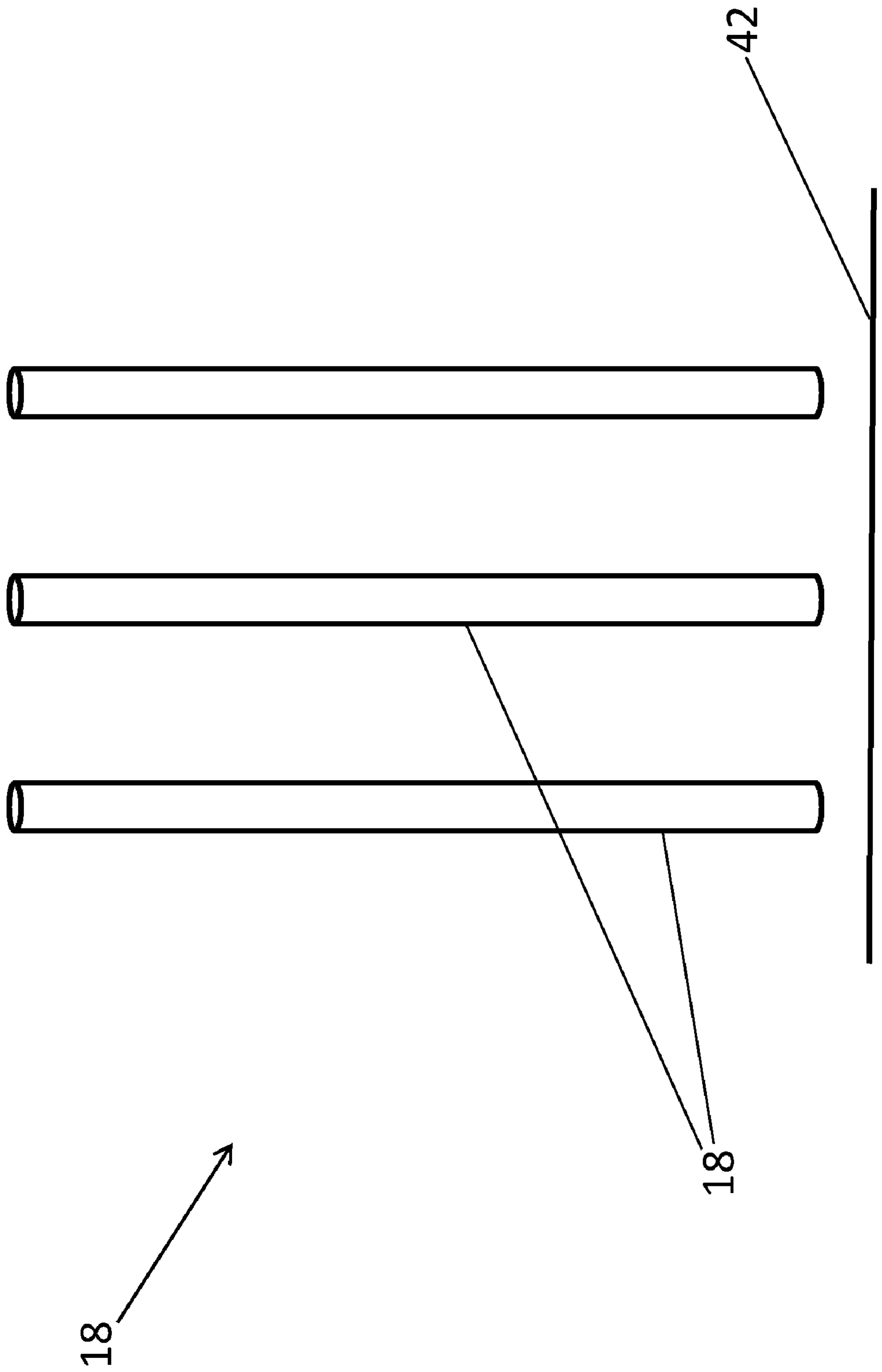
FIG. 4 is a simplified schematic diagram representing an isolated view of heated coils for a rotary dryer.

The coils can be oriented vertically, for example, oriented vertically relative to the ground where the rotary dryer sits (as shown in FIG. 4) and parallel to a diameter of the cylindrical body. This unique vertical orientation results in coils that do not comprise horizontal surfaces. For example, as back-flow resin particles from the cylindrical body fall vertically with gravity within the rotary dryer toward the ground, there will be no horizontal coil surface on which any particles can accumulate. For example, with the vertical orientation of coils as shown in FIG. 4, falling particles will simply glance off the sides of the coils and not accumulate. This prevention of particle accumulation greatly reduces the risk of overheating.

A pressure within the rotary dryer can be sub-atmospheric, for example, less than or equal to 100 kiloPascals. A temperature within the cylindrical body can be from 45° C. to 150° C., for example, from 50° C. to 140° C. For example, an inlet temperature to the cylindrical body can be 85° C. to 140° C. and an outlet temperature can be 45° C. to 80° C. The dehydration method described herein can be carried out in an air atmosphere. In other words, due to the reduced risk of overheating and fire achieved by the present rotary dryer, it is not necessary to carry out the dehydration process in a nitrogen atmosphere.

The cylindrical body, coils, lifters, or a combination thereof, can comprise a corrosion resistant material, a porous material, a non-combustible material, a woven material, or a combination thereof, for example, stainless steel, polypropylene, or a combination thereof. For example, the cylindrical body and/or the coils can comprise stainless steel. Porosity of the material can allow air to be pulled through, thus keeping surfaces free of resin build-up.

The rotary dryer disclosed herein does not require metal-to-metal contact within the cylindrical body. For example, metal-to-metal contact between components within the cylindrical body is not required. The rotary dryer also does not require ball bearings within the cylindrical body. This unique arrangement reduces friction and therefore reduces risk of sparks and/or fire related hazards.

The rotary dryer disclosed herein can further comprise an air filter located outside the cylindrical body. In other words, the air filter can be stationary and does not rotate with the cylindrical body. The air filter can comprise any suitable non-combustible material, for example, fiber glass material. For example, the air filter can comprise a fiberglass mesh, metal grid support, aluminized frame, non-flammable frame, or a combination thereof. For example, the air filter can be a Purolator Hi-E 40 pleated filter.

The rotary dryer further comprises an entry point for the feed stream. The entry point can be located outside the cylindrical body. In other words, the entry point can be stationary and does not rotate with the cylindrical body. The entry point and the coils can be spaced apart by 2 meters to 10 meters, for example, 3 meters to 8 meters, for example, 5 meters to 7 meters.

A product stream comprising a dehydrated resin can be withdrawn from the rotary dryer. For example, the product stream can comprise less than or equal to 5% water by weight, for example, less than or equal to 2% water by weight, for example, less than or equal to 1% water by weight.

The rotary dryer can also comprise automated flow rate control, automated temperature control, automated pressure control, automated level control, automated composition control, internal camera surveillance, or a combination thereof. The rotary dryer can comprise computer-controlled pumps/compressors. These pumps can control the rotary dryer parameters, for example, flowrates of streams entering and exiting the rotary dryer. The rotary dryer and related streams can be heated using heat exchangers, for example, a Proportional-Integral-Derivative (PID) controlled electronic heater.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Referring now to FIG. 1, a unit configuration for a rotary dryer 10, used in a method of resin dehydration, comprises an air feed stream 12 which can be passed through an air filter 14. The resulting filtered air stream 16 can then be passed through heated coils 18 to produce a heated air stream 20. The heated air stream 20 can be passed through a cylindrical body 24. A wet resin feed stream 22 can also be passed through the cylindrical body 24, combined with the hot air stream 20. The cylindrical body 24 can rotate about an axis 26 perpendicular to a diameter 28 of the cylindrical body 24. A dehydrated resin product stream 30 can be withdrawn from the rotary dryer 10 and optionally passed through a resin/air separator unit 31.

Figure 2:
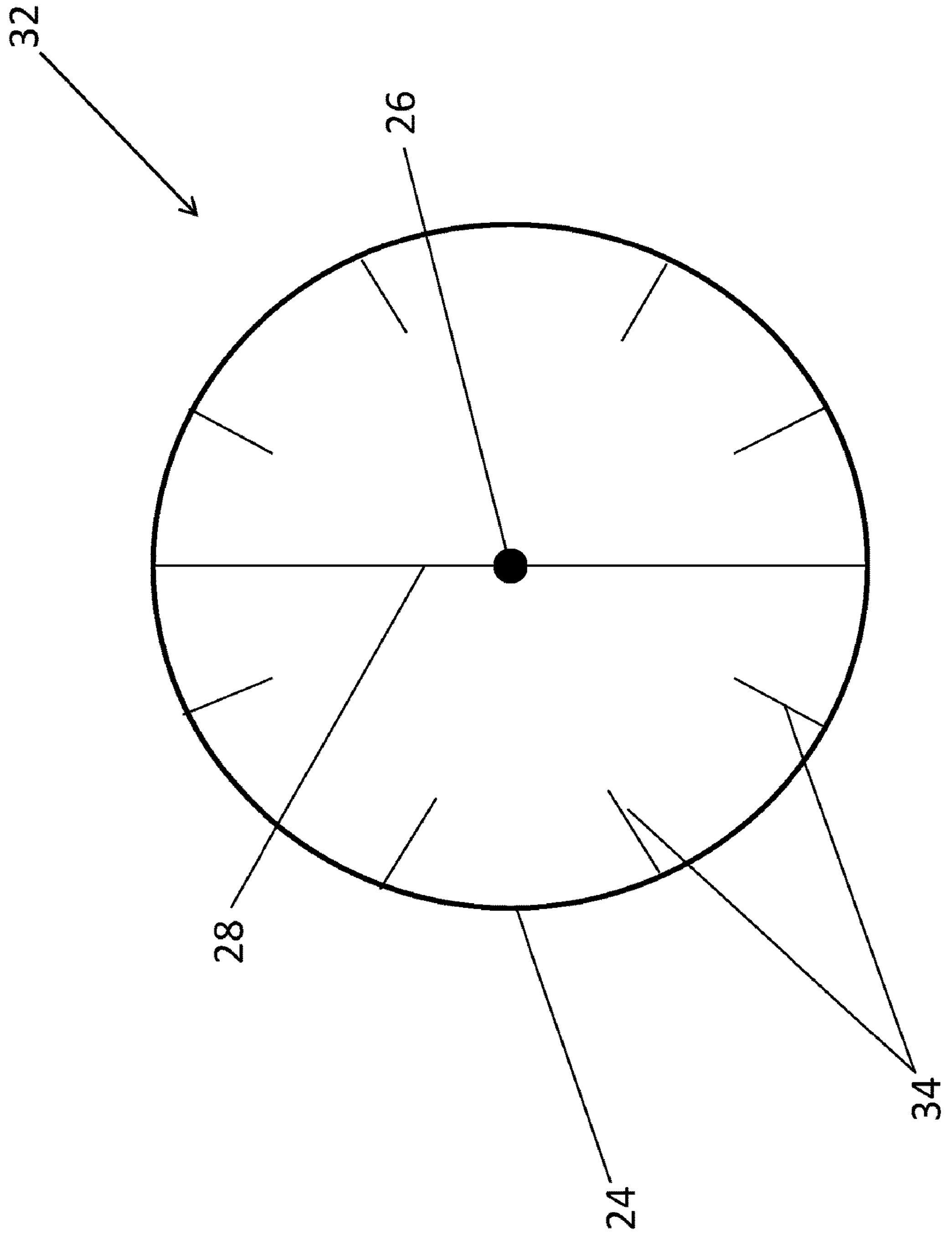
FIG. 2 is a simplified schematic diagram representing a cross-sectional view along a diameter of a cylindrical body of a rotary dryer.

Referring now to FIG. 2, a cross-sectional view 32, along a diameter 28 of a cylindrical body 24 of a rotary dryer 10, comprises lifters 34 within the cylindrical body 24.

Figure 3:
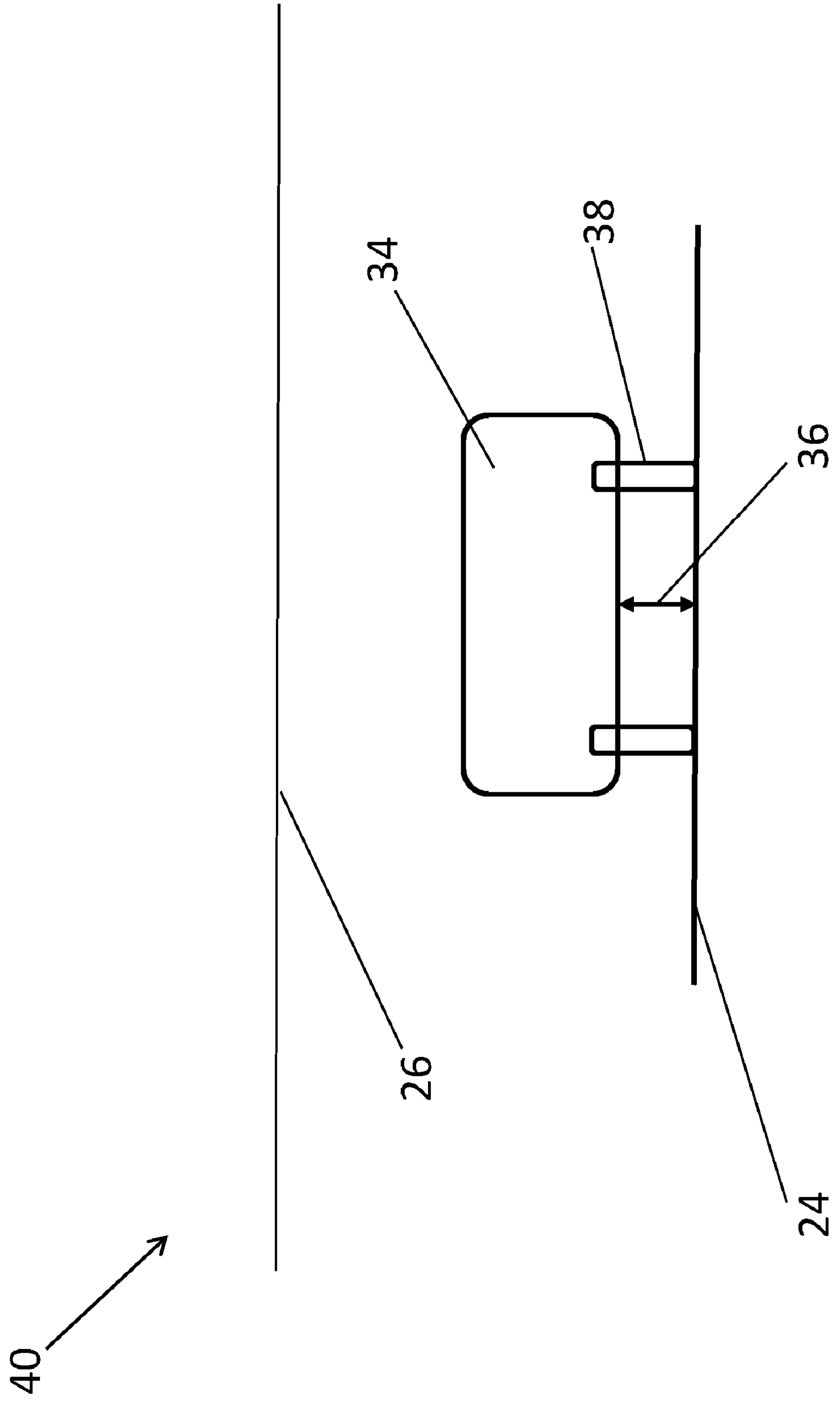
FIG. 3 is a simplified schematic diagram representing an isolated view of a lifter within a cylindrical body of a rotary dryer.

Referring now to FIG. 3, an isolated view 40, of a lifter 34 within a cylindrical body 24 of a rotary dryer 10, comprises attachment mechanisms 38, for example, brackets, which attach the lifter 34 to the cylindrical body 24. A space 36 separates the lifter 34 from the cylindrical body 24.

Referring now to FIG. 4, an isolated view of heated coils 18 for a rotary dryer 10 comprises vertically oriented heated coils 18, for example, heated coils 18 which are oriented vertically relative to the ground level 42 where the rotary dryer 10 sits.

The following examples are merely illustrative of the rotary dryer and method disclosed herein and are not intended to limit the scope hereof.

EXAMPLE

Experimental trials were conducted using a rotary dryer as shown in FIG. 1-4 for producing dehydrated resin.

The shape and size of accumulated resin particles within the rotary dryer were varied and analyzed. Two particle shapes were used: spherical-shaped particles and slab-shaped particles. The diameter of the spherical-shaped particles was varied in meters (m). Similarly, the half-thickness of the slab-shaped particles was also varied in meters (m). Particles comprising 70% polybutadiene resin and 30% styrene/acrylonitrile copolymer were used. A computer-based distributed control system (DCS) was used for data collection and analysis.

Rubber oxidation kinetic rate parameters were used in bounding the dynamic DCS data: Dk=1000 Unit factor; Secm=60.00 [sec/min] Conversion factor; Tck=273.15 [° C.=0]; rg1=1.987 [calories/gram mole Kelvin] Gas constant; Cs=1000.00 [J/kg K] Heat Capacity; K=0.06 [watts/meter Kelvin] Thermal Conductivity of Sample; Rho=385.00 [kg/$m^3$] Density of Sample; Hrxc=626.00 [calories/gram] Heat of Reaction of 100% Rubber; T210c=150.0 [° C.] Ten hour half-life temperature; DT2r=6.0 [° C.] Reaction rate doubling temperature interval; Hrxs=438.2 [calories/gram] Heat of Reaction of Sample; Hrxj=1833.43 [kJ/kg] Heat of Reaction; T210 k=423.15 [° K] Ten hour half-life temperature; B=20978.657 [° K] Reduced activation energy; Ea=41.685 [kcal/gram mole] Activation energy; A=3.9250E+18 [min−1] Pre-exponential factor; Time-to-maximum rate at T210 k; Dm=0.0127 [meter] Mas diameter; Fg=1.0 Geometry Factor; and Sphere=12.0; Slab (1 side)=1.0.

Figure 5:
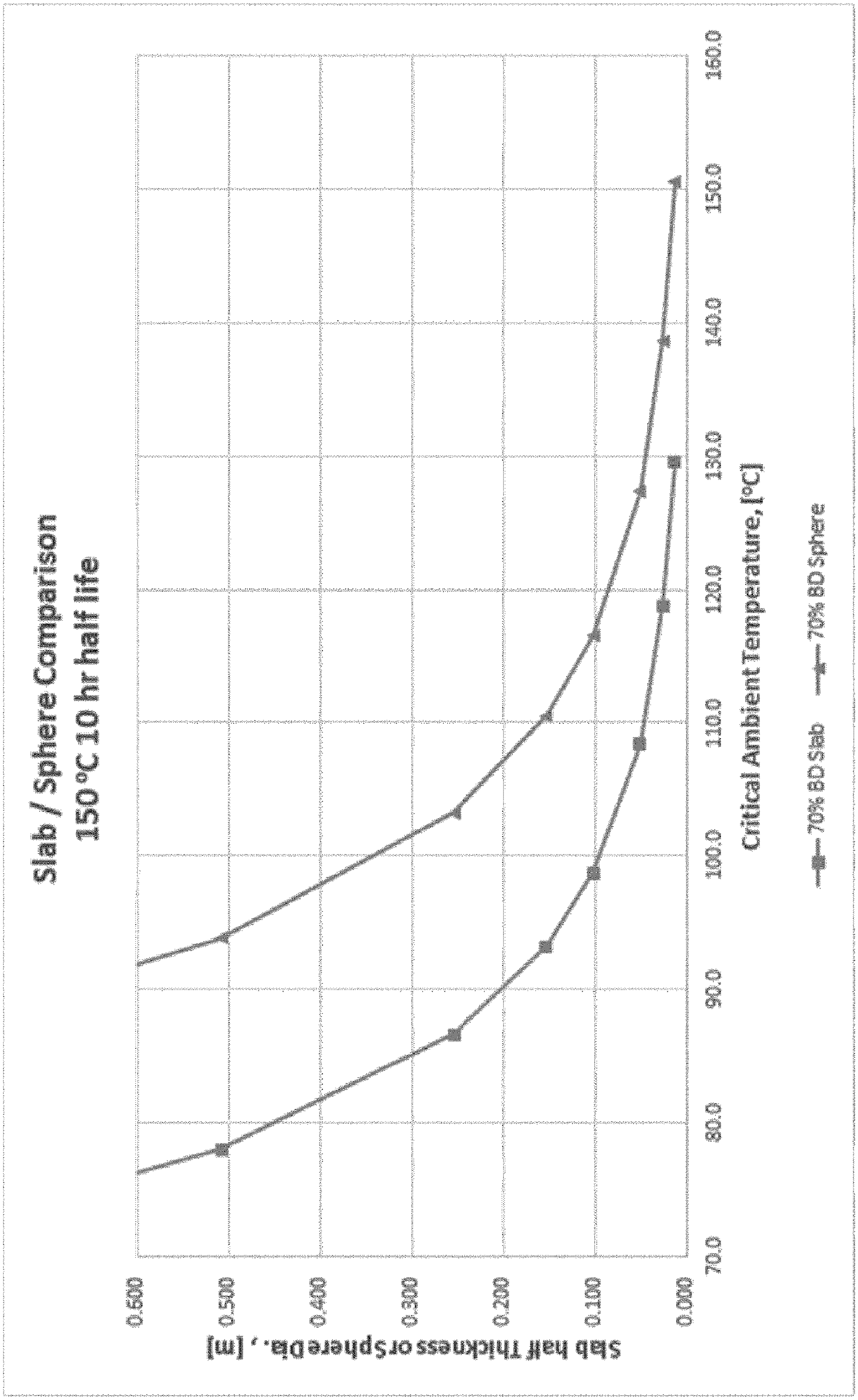
FIG. 5 is a graph showing data for resin particle size in meters (m) vs. critical ambient temperature (° C.) within a rotary dryer.

Results for resin particle size vs. critical ambient temperature are shown in Table 1 and FIG. 5. The critical ambient temperature is the temperature at, or above which, the particle will undergo runaway thermal oxidation, or in other words, become an inflamed ember, thus resulting in fire hazards within the rotary dryer.

TABLE 1

Resin particle size vs. critical ambient temperature

| Sphere | | Slab | |
|---|---|---|---|
| Diameter (m) | Critical Ambient Temperature (° C.) | Half-Thickness (m) | Critical Ambient Temperature (° C.) |
| 0.0127 | 150.6 | 0.0127 | 129.6 |
| 0.0254 | 138.6 | 0.0254 | 118.7 |
| 0.0508 | 127.3 | 0.0508 | 108.4 |
| 0.1016 | 116.5 | 0.1016 | 98.7 |
| 0.1524 | 110.5 | 0.1524 | 93.2 |
| 0.254 | 103.2 | 0.254 | 86.6 |
| 0.508 | 93.8 | 0.508 | 78 |
| 0.762 | 88.4 | 0.762 | 73 |

As now surprisingly shown in Table 1 and FIG. 5, the larger the particle size, the lower the critical ambient temperature, or in other words, the lower the threshold for runaway thermal oxidation and fire hazard. Conversely, the smaller the particle size, the higher the critical ambient temperature, or in other words, the easier it is for a particle to remain thermally stable.

Not to be bound by theory regarding thermal stability, it is understood that for a given ambient temperature there is a critical dimension or size for which heat generation due to thermal oxidation will exceed the heat loss rate. For dimensions greater than this critical size a runaway thermal oxidation reaction can occur. In large masses, maximum reaction temperatures can lead to automatic ignition of particles and formation of burning embers. Large particles and layers of polymers allow energy (e.g., temperature) to build within the polymer as thermal oxidation occurs. The temperature within thicker layers of material can build to the point of ignition whereas thinner layers dissipate the energy keeping the polymer temperature low.

As demonstrated, the unique design of the rotary dryer, and method of using the same disclosed herein, can significantly reduce the accumulation of resin particles on components of the rotary dryer, reduce the size of accumulated particles, and therefore significantly reduce the risk of overheating, fires, explosions, and other heat related hazards.

The processes disclosed herein include(s) at least the following aspects:

Aspect 1: A rotary dryer (10) for resin dehydration, comprising: a cylindrical body (24) which rotates about an axis (26) perpendicular to a diameter (28) of the cylindrical body (24); an air filter (14) located outside the cylindrical body (24); coils (18) located outside the cylindrical body (24), wherein the coils (18) are oriented vertically and oriented parallel to the diameter (28) of the cylindrical body (24), wherein the coils (18) do not comprise horizontal surfaces; and lifters (34) located within the cylindrical body (24).

Aspect 2: The rotary dryer (10) of Aspect 1, wherein the lifters (34) are spaced apart from the cylindrical body (24) by 0.1 millimeters to 10 millimeters, preferably 0.5 millimeters to 5 millimeters, more preferably 1 millimeter to 3.5 millimeters, more preferably 2.75 millimeters to 3.1 millimeters.

Aspect 3: The rotary dryer (10) of any of the preceding aspects, wherein a pressure within the rotary drier (10) is sub-atmospheric, preferably less than or equal to 100 kiloPascals.

Aspect 4: The rotary dryer (10) of any of the preceding aspects, wherein the cylindrical body (24), coils (18), lifters (34), or a combination thereof, comprise a corrosion resistant material, a porous material, a non-combustible material, a woven material, or a combination thereof, preferably stainless steel, polypropylene, or a combination thereof.

Aspect 5: The rotary dryer (10) of any of the preceding aspects, wherein a temperature within the cylindrical body (24) is from 45° C. to 150° C., preferably from 50° C. to 140° C.

Aspect 6: The rotary dryer (10) of any of the preceding aspects, wherein the rotary dryer (10) does not comprise ball bearings.

Aspect 7: The rotary dryer (10) of any of the preceding aspects, wherein the air filter (14) comprises a non-combustible material, preferably wherein the air filter (14) comprises a fiberglass mesh, metal grid support, aluminized frame, non-flammable frame, or a combination thereof, more preferably a fiberglass mesh.

Aspect 8: The rotary dryer (10) of any of the preceding aspects, wherein the cylindrical body (24) comprises a porous material.

Aspect 9: The rotary dryer (10) of any of the preceding aspects, wherein the cylindrical body (24), lifters (34), or a combination thereof, comprise a corrosion resistant material, a porous material, a non-combustible material, a woven material, or a combination thereof, preferably stainless steel, polypropylene, or a combination thereof, wherein the rotary dryer (10) does not comprise metal to metal contact within the cylindrical body (24).

Aspect 10: A method of resin dehydration using the rotary dryer (10) of any of the preceding claims, the method comprising: feeding a feed stream (22) comprising a wet resin into the rotary dryer (10); heating the coils (18); rotating the cylindrical body (24); contacting the wet resin with the lifters (34); and withdrawing a product stream (30) comprising a dehydrated resin from the rotary drier (10).

Aspect 11: The method of Aspect 10, wherein a source of the wet resin is an emulsion polymerization process, preferably emulsion polymerization of styrene, acrylonitrile, polybutadiene latex, or a combination thereof.

Aspect 12: The method of any of Aspects 10-11, wherein the wet resin comprises acrylonitrile-butadiene styrene, styrene-butadiene styrene, acrylonitrile-ethylene-butadiene-styrene, methyl methacrylate-butadiene styrene, styrene acrylonitrile, styrene butadiene rubber, acrylonitrile butadiene rubber, methyl methacrylate-acrylonitrile-butadiene-styrene, or a combination thereof.

Aspect 13: The method of any of Aspects 10-12, wherein the wet resin comprises an antioxidant, preferably a hindered phenol, a phosphite compound, a thioester compound, or a combination thereof.

Aspect 14: The method of any of Aspects 10-13, further comprising passing a flame suppressant powder through the rotary dryer (10), preferably passing sodium carbonate powder through the rotary dryer (10).

Aspect 15: The method of any of Aspects 10-14, wherein the rotary dryer (10) further comprises an entry point for the feed stream (22), wherein the entry point and the coils (10) are spaced apart by 2 meters to 10 meters, preferably 3 meters to 8 meters, more preferably 5 meters to 7 meters.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The modifier "about" used in connection with a quantity is inclusive of the stated value and has the meaning dictated by the context (e.g., includes the degree of error associated with measurement of the particular quantity). The notation "+10%" means that the indicated measurement can be from an amount that is minus 10% to an amount that is plus 10% of the stated value. The terms "front", "back", "bottom", and/or "top" are used herein, unless otherwise noted, merely for convenience of description, and are not limited to any one position or spatial orientation. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A rotary dryer for resin dehydration, comprising:

a cylindrical body which rotates about an axis perpendicular to a diameter of the cylindrical body;

an air filter located outside the cylindrical body;

coils located outside the cylindrical body, wherein the coils are oriented vertically and oriented parallel to the diameter of the cylindrical body, wherein the coils do not comprise horizontal surfaces; and lifters located within the cylindrical body.

2. The rotary dryer of claim 1, wherein the lifters are spaced apart from the cylindrical body by 0.1 millimeters to 10 millimeters.

3. The rotary dryer of claim 1, wherein a pressure within the rotary drier is sub-atmospheric.

4. The rotary dryer of claim 1, wherein the cylindrical body, coils, lifters, or a combination thereof, comprise a corrosion resistant material, a porous material, a non-combustible material, a woven material, or a combination thereof.

5. The rotary dryer of claim 1, wherein a temperature within the cylindrical body is from 45° C. to 150° C.

6. The rotary dryer of claim 1, wherein the rotary dryer does not comprise ball bearings.

7. The rotary dryer of claim 1, wherein the air filter comprises a non-combustible material.

8. The rotary dryer of claim 7 wherein the air filter comprises a fiberglass mesh, metal grid support, aluminized frame, non-flammable frame, or a combination thereof.

9. The rotary dryer of claim 1, wherein the cylindrical body comprises a porous material.

10. The rotary dryer of claim 1, wherein the cylindrical body, lifters, or a combination thereof, comprise a corrosion resistant material, a porous material, a non-combustible material, a woven material, or a combination thereof.

11. The rotary dryer of claim 10 wherein wherein the cylindrical body, lifters, or a combination thereof comprise stainless steel, polypropylene, or a combination thereof.

12. The rotary dryer of claim 10 wherein the rotary dryer does not comprise metal to metal contact within the cylindrical body.

13. A method of resin dehydration comprising:

feeding a feed stream comprising a wet resin into a rotary dryer, the rotary dryer comprising a cylindrical body which rotates about an axis perpendicular to a diameter of the cylindrical body;

an air filter located outside the cylindrical body;

coils located outside the cylindrical body, wherein the coils are oriented vertically and oriented parallel to the diameter of the cylindrical body, wherein the coils do not comprise horizontal surfaces; and lifters located within the cylindrical body;

heating the coils;

rotating the cylindrical body;

contacting the wet resin with the lifters; and withdrawing a product stream comprising a dehydrated resin from the rotary dryer.

14. The method of claim 13, wherein a source of the wet resin is an emulsion polymerization process.

15. The method of claim 13, wherein the wet resin comprises acrylonitrile-butadiene styrene, styrene-butadiene styrene, acrylonitrile-ethylene-butadiene-styrene, methyl methacrylate-butadiene styrene, styrene acrylonitrile, styrene butadiene rubber, acrylonitrile butadiene rubber, methyl methacrylate-acrylonitrile-butadiene-styrene, or a combination thereof.

16. The method of claim 13, wherein the wet resin comprises an antioxidant.

17. The method of claim 13, further comprising passing a flame suppressant powder through the rotary dryer.

18. The method of claim 17 wherein the flame suppressant powder comprises sodium carbonate powder.

19. The method of claim 13, wherein the rotary dryer further comprises an entry point for the feed stream, wherein the entry point and the coils are spaced apart by 2 meters to 10 meters.

20. A method of dehydration of acrylonitrile butadiene styrene particles comprising feeding a stream of the acrylonitrile butadiene styrene particles into a rotary dryer, the rotary drying comprising a cylindrical body which rotates about an axis perpendicular to a diameter of the cylindrical body; an air filter located outside the cylindrical body; coils located outside the cylindrical body, wherein the coils are oriented vertically and oriented parallel to the diameter of the cylindrical body, wherein the coils do not comprise horizontal surfaces; and lifters located within the cylindrical body, heating the coils;

rotating the cylindrical body;

contacting the wet resin with the lifters; and withdrawing a product stream comprising a dehydrated resin from the rotary dryer.

* * * * *